United States Patent [19]

Mascarenhas

[11] Patent Number: 4,979,795
[45] Date of Patent: Dec. 25, 1990

[54] COILABLE TORQUE-BALANCED CABLE AND METHOD OF MANUFACTURE

[75] Inventor: Olinda Mascarenhas, Fords, N.J.

[73] Assignee: AT&T Bell Laboratories, Murray Hill, N.J.

[21] Appl. No.: 373,967

[22] Filed: Jun. 29, 1989

[51] Int. Cl.$^5$ .............................................. G02B 6/44
[52] U.S. Cl. .................................. 350/96.23; 174/108
[58] Field of Search ........................... 350/96.23, 96.3; 174/108

[56] References Cited

U.S. PATENT DOCUMENTS

| 4,522,464 | 6/1985 | Thompson et al. | 350/96.23 |
| 4,523,804 | 6/1985 | Thompson | 350/96.23 |
| 4,606,604 | 8/1986 | Soodak | 350/96.23 |

*Primary Examiner*—John D. Lee
*Assistant Examiner*—John Ngo
*Attorney, Agent, or Firm*—Charles E. Graves

[57] ABSTRACT

A class of torsionally-balanced submarine cables is disclosed which are highly coilable without exhibiting the undesirable tendencies of looping and kinking of its predecessors. Coilability is achieved in part by controlling the cable's torsional stiffness to bending stiffness ratio. Use of glass-reinforced polyester tape between and over the armor wires facilitates movement of the armor wire during coiling. The teachings of the present invention apply to cables experiencing strains in the elastic range.

10 Claims, 5 Drawing Sheets

COILABLE TORQUE-BALANCED CABLE AND METHOD OF MANUFACTURE

This invention was made with Government support under contract N00039-89-C-0083 with the United States Navy. The Government has certain rights in this invention.

This invention relates to design of armored undersea telecommunications cable systems; and particularly to achieving a torque-balanced cable system which exhibits substantial freedom from kinking or looping during storage and coiling.

BACKGROUND OF THE INVENTION

Undersea telecommunications cables frequently must have armor protection to safeguard against natural and man-caused risks which would damage or destroy an unprotected core. Armor usually is provided by one or more lays of galvanized steel wires around the core and its jacketing.

Use of armor wires, however, risks damage or structural deformation to the cable due to twisting motion caused by torsion which the cable and core undergo during installation. Some armored submarine cables of the prior art mitigate the risk of torsional damage by providing torque-balance, a design expedient which counters the twisting tendency. Using a torque-balanced cable throughout a system reduces overall the risk of such damage, which is highly desirable because torsional damage frequently occurs during installation when it is difficult or impossible to detect.

Despite the advantage of torque-balanced cable in avoiding risks of twisting damage, however, relatively little torque-balanced cable has been installed in undersea telecommunications plant. One reason is its poor shipboard storage and handling properties and specifically, its tendency to form loops or kinks if the cable is coiled in small diameters. Kinks are manifestations of the relieving of severe bending stresses in the cable; and in themselves they adversely affect the cable's structural integrity. As a result, the looping tendencies of present designs of armored torque-balanced cable have substantially reduced its potential applications in undersea plant, both military and commercial.

Undersea cable designs capable of being coiled in small diameters without kinking are desirable for the further reason that more efficient use of cable storage volume on board ship can thereby be made, which in turn can generate cost reductions in the installation. The "figure-8" cable coiling configuration typically used shipboard is an example of wasteful use of storage space.

If torque balance is to be included in any segment of an undersea cable system, it is desirable that the entire system be torque-balanced, since otherwise transition cables are required to couple one cable type to another. By using a torque-balanced system, however, no transition cables are needed; and the costs and complexities of cable system installation are reduced.

OBJECTS OF THE INVENTION

Accordingly, one object of the invention is to provide a torque-balanced undersea cable which can be coiled to small diameters.

Another object of the invention is to achieve such a cable while retaining the desirable properties which characterize torque-balanced cables.

An additional object of the invention is to provide a comprehensive undersea cable system whose structure is torque-balanced throughout the installation, from open ocean depths to shore linkages in relatively shallow water.

SUMMARY OF THE INVENTION

This invention in its broadest application teaches a class of torsionally balanced submarine cables which are highly coilable without exhibiting the undersirable tendencies of looping and kinking of its predecessors. The invention may be applied to telecommunications cables, as described below; or may be applied to other types of cable, such as power cables.

Coilability is achieved in part, pursuant to the invention, by controlling the cable's torsional stiffness (JG) to bending stiffness ratio (EI) to within certain bounds heretofore not recognized.

In a particular embodiment, the use of glass-reinforced polyester tape between and over the armor wires has been found to facilitate movement of the armor wire during coiling, and thus facilitates the coiling. The tape also acts as a bedding.

Desirably, although not necessarily, maintaining to within prescribed bounds the torsional stiffness to cable weight ratio can also contribute to achieving a coilable torque-balanced cable.

Deep and shallow water illustrative embodiments, hereinafter described, may be combined pursuant to the invention to create a torque-balanced undersea communication cable system.

Weight of the cable design is significant because weight affects the coilability. The heavier the cable, the less is the likelihood that the cable will lop or become unstable.

Thus, essentially through a control of a relatively few cable structure parameters, a solution of a large and significant undersea cable installation problem is afforded which avoids cable looping and kinking while contributing to reduction of installation costs and an increase in installed cable reliability.

The teachings of the present invention are substantially independent of cable diameter; and are generic for cables experiencing strains in the elastic range.

The foregoing and other objects, features and advantages of the invention will be apparent from a reading of the description to follow of an illustrative embodiment thereof.

DETAILED DESCRIPTION OF AN ILLUSTRATIVE EMBODIMENT

1. Theoretical Considerations

According to prior analyses, it is generally accepted that torque-balanced cables resist coiling to small diameters. The reason is not that the cable design incorporates torque-balancing structural features per se, but rather that there is no preferred direction to weak torsional rigidity. In non-torque-balanced cables, the value of the torsional rigidity, JG, is different depending on the direction of the twist. In the direction of a tightening of the helical armor windings, the value of JG is relatively large; in which case the windings tighten around the core of the cable. But in the direction of unlaying the armor helix, the value of JG is relatively small.

Thus, in general, armored cables are coiled in the "unlay" direction, which is in the direction of smaller values of JG. In torque-balanced cables, however, since there is no preferred direction of armor wire twist for which values of JG would be smaller, there is no "unlay" direction.

On closer analysis, however, the coilability of even a torque-balanced cable can be enhanced if full recognition is given to the control of the value of JG.

In coiling cable, a twist of $2\pi$ radians for each coil of length $2\pi R$ is imposed, resulting in a twist per unit length of $1/R$ radians/inch, where R is the radius of the coil. It can be shown that, based on lumped energy conservation, the coiling radius must be greater than:

$$R > \frac{1}{\pi}\left(\frac{JG}{EI}\right)\left(\frac{EI}{T}\right)^{\frac{1}{2}} \quad (1)$$

The value of the term T in equation 1 may be calculated by solving for T the following expression:

$$\frac{HW}{T} = \cosh\left(\frac{RW}{T} - \frac{1}{\mu}\right) - 1 \quad (2)$$

where W is the cable weight per unit length; H is the height or length of the catenary (for example, from a cable ship's deck to the floor of the coiling tank); and T is the cable tension the point where the cable touches down on the coiling tank floor.

Persons skilled in the art will recognize that graphical solutions of the equations (1) and (2) are feasible. These yield theoretical values of the minimum coiling radius for a selected set of equation variables. It is seen that a torque-balanced cable structure in which the value of JG is substantially reduced, can result in a cable which can be coiled to substantially smaller diameters without developing kinks or loops.

It has been little appreciated in known previous designs of torque-balanced cables, that the value of JG varies as the square of the lay angle of the armor wire. The implication of this fact to the present invention is that reduced values of JG can be achieved with relatively modest reductions of the lay angles of both the right-hand and the left-hand armor layers.

An added advantage of the preceding is that the value of EI is slightly increased by the same reduction of the lay angle, which contributes to the easing of the cable's resistance to coiling.

2. Description of a First Illustrative Embodiment of the Invention.

Figure 1:
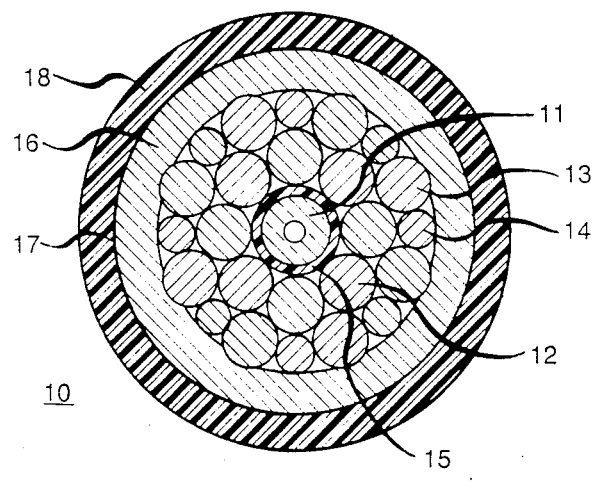
FIG. 1 is a cross-sectional view of a cable core containing the transmitting optical fiber.

The cable design in this example consists of a deep water core 10, depicted in FIG. 1, which is conventional. Other core structures may be used. The core 10 includes a buffered communications optical fiber member denoted 11. The fiber member's diameter is approximately 0.065 inches. Over the member 11, a region of steel wires is placed, which consist in this example of a cluster 12 of eight wires of 0.041 inch diameter, a second cluster 13 of eight wires of 0.039 inch diameter, and a third cluster 14 of eight wires of 0.030 diameter. These are applied with a 6-inch left-hand overlay. An encapsulate of polyurethane, denoted 15, is applied around the member 11 and between the wires of the clusters 12, 13, 14. A copper tube 16 next is applied over the wires, to an outside diameter of approximately 0.249 inches. A thin layer 17 of a commercial copolymer is applied over the copper tube 16. A jacket 18 of medium density polyethylene is applied over the structure, to an outside diameter of approximately 0.420 inches.

Figure 2:
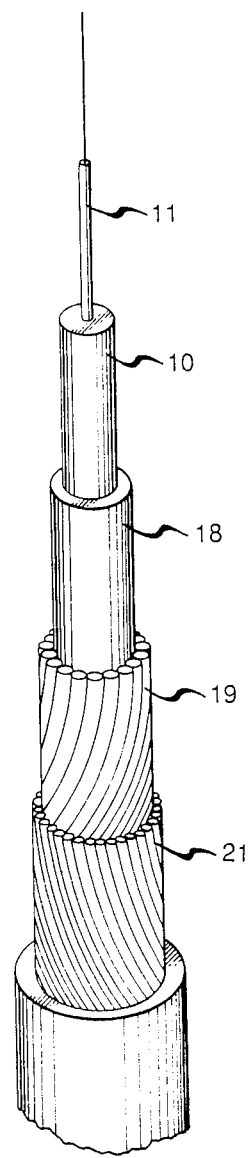
FIG. 2 is an isometric view of the cable structure layers and components.
Figure 3:
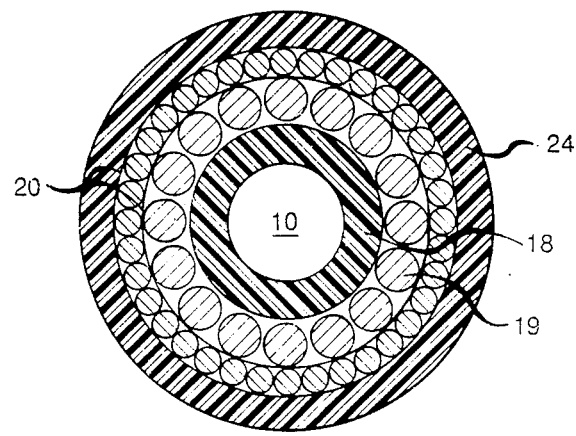
FIG. 3 is a cross-sectional view of the cable structure of FIG. 2.

As shown in FIGS. 2 and 3, the armor layers next to be applied, comprise a first layer 19 of sixteen galvanized steel wires, preformed to form helices prior to their being assembled over the jacket 18. The percent preform is controlled. In the instant illustrative embodiment, with the jacket 18 diameter of 0.420, the inside diameter of the preform of the first armor layer 19 is 0.510 inches. Thus, the precent preform is 0.420/0.510, or 82 percent. The significance of a preform of 82 percent is that an average clearance of approximately 0.045 inches is afforded between the core surface and the preform inside diameter, which is advantageous because it reduces the tendency of the armor wires to embed into the insulation during coiling. Further, because the armor wires are formed, the wires have more freedom to move and remain strain-free.

A 10-degree right-hand lay angle is imparted to the wires of the first armor layer 19. The outside diameter of the first layer is 0.60 inches.

Figure 4:
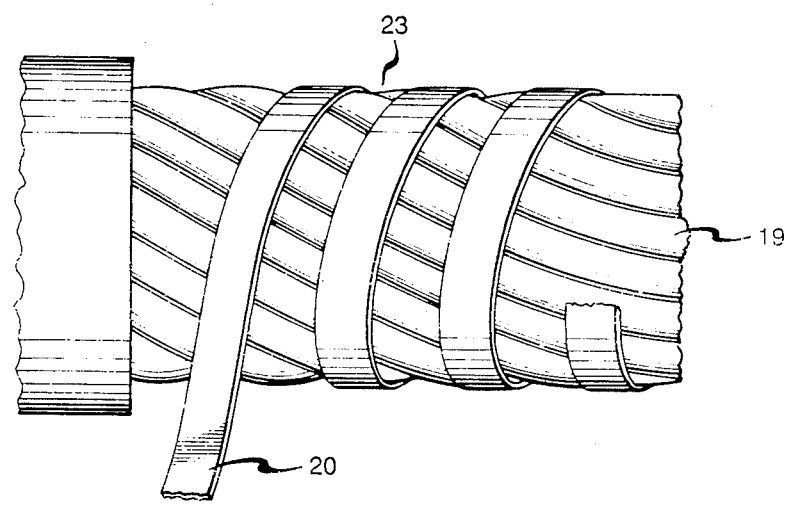
FIG. 4 is side view of a portion of the cable of FIG. 3, showing application of tape.

As shown in FIG. 4, a 0.006 inch thick by 0.5 inch-wide glass reinforced polyester tape layer 20 is wrapped around the first layer 19 of armor wires, using a 1.91 inch left-hand lay, to a 0.612 inch outside diameter. The function of tape layer 20 is to aid movement of armor wire during coiling, and to hold armor wires during the cable's manufacture.

Next, a second layer 21 consisting of 36 galvanized steel wires each being 0.052 inch in outside diameter, is applied using a 10 degree lay angle and a left-hand lay to an outside diameter of of 0.716 inches. A further application of glass-reinforced tape (not shown) is placed over the second armor wire layer 21. This second tape layer functions to also hold the armor wires.

A high-density polyethylene outer jacket 24 is extruded over the final tape. The final outside diameter of the cable of the instant embodiment is 0.910 inches.

An open lay is used in applying the tape layers, to provide adequate adhesion of the steel wires, the tape and the outer jacket 18. That is, the tape is applied with a gap 23, between adjacent turns as shown in FIG. 4. If no gap were provided, the armor wires would be covered completely with the tape. The gap 23 allows the polyethylene substance of the final jacket to become extended to the region between the tape and the valleys formed by adjacent armor wires., during the extrusion of the polyethylene jacket 24. The result is a firm and strong bond between the jacket 24 and the layers 19, 21 of armor wires.

The above-described design exhibits, pursuant to the invention, a torsional stiffness to bending stiffness ratio of approximately 2.34. The ratio is achieved by reducing the lay angles of both armor layers to approximately 10 degrees. By so reducing the lay angles, the torsional stiffness is reduced significantly. The calculated torsional stiffness (JG) of the cable of this example is 16,828 inch-squared pounds. The bending stiffness (EI) is 7,166 inch-squared pounds. Thus, the theoretical JG/EI ratio is 2.34. The measured JG/EI ratio of the described design, is in a range of 2.37 to 2.47. Coiling diameters of as low as 4.5 feet have been achieved with cables designed and manufactured pursuant to the inventive teachings.

Prior art torque-balanced cables with similar configurations, exhibit an inability to be coiled. These typically have a JG/EI ratio in the vicinity of 10. One exemplary such cable had a JG/EI ratio of 9.88, wherein JG=69,634 inch-squared-pounds and EI=7041 inch-squared-pounds. The reducing of the JG/EI ratio is material to realizing the cable coilability. The JG/EI ratio which achieves substantial coilability results in accordance with the invention, thus is seen to be approximately 3.00.

Pursuant to a further aspect of the invention, a relatively small reduction in the per-cent of armor coverage (the extent to which the armor wires cover or surround the cable core) has been found to make an unexpectedly large additional contribution to cable coilability. Generally, armored cables are designed with armor wire coverage in the range of 95-98 percent. In the cable as taught in the present invention, however, the coverage is reduced, but only relatively slightly. For example, in the cable of example 1 above, the coverage of layer 19 is 92 percent, and that of. No significant reduction in the protection afforded to the core by the armor is attendant the coverage 10 reduction.

The cable of this inventive example allows the inner polyethylene insulation of the core 10 to experience relatively more radially compression during coiling. Thus, more coil twist per unit length can take place before lockup or binding occurs. The preforming, the relatively low lay angles of the armor wires, and the tape applications all play a vital role in the design.

3. Description of a Shallow Depth Cable Structure

One of the invention's objects is to provide a cable system including a deep water component and a shore link, both being torque-balanced. The embodiment described above fulfills the deep water requirement. The cable structure next to be described is a useful shore link exhibiting torque-balance and high resistance to the damage sources (commercial fishing, etc.) common in shallower waters.

Figure 5:
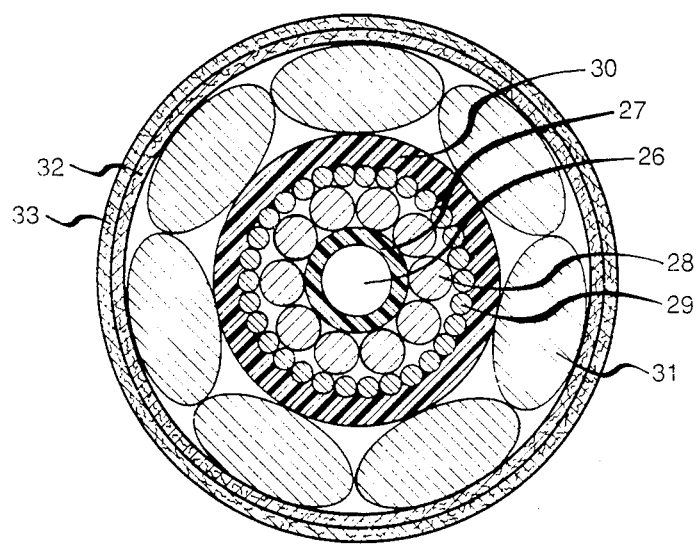
FIG. 5 is a cross-sectional view of a complementary cable structure useful in a fully torque-balanced system.
Figure 6:
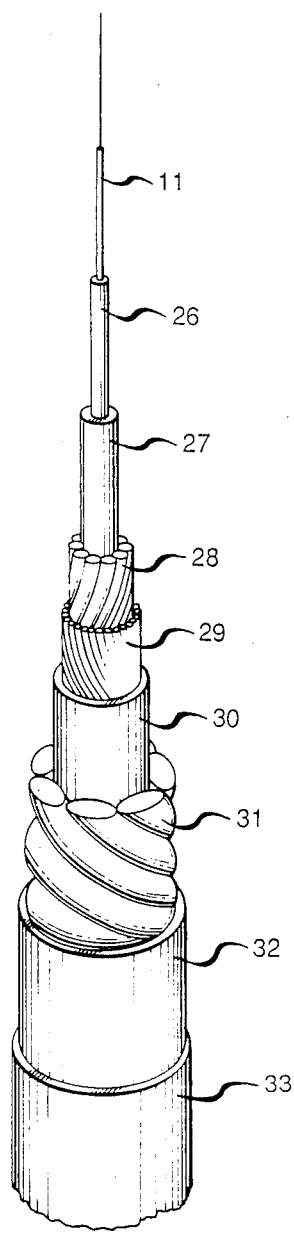
FIG. 6 is an isometric diagram of the cable of FIG. 5.

The cable, denoted 25 and shown in FIG. 5, fits the design requirement for the shore link. It consists of a trunk core 26 of 0.250 inch outside diameter, similar in structure to that of FIG. 1, over which is placed a belt 27 of medium density polyethylene, to an outside diameter of 0.490 inch. Then, a first layer 28 of ten galvanized steel wires each having a diameter of 0.191 inch (190 ksi) are stranded, using a 19.1 degree lay angle and a right-hand lay. The resulting outside diameter is 0.872 inch.

Next, a second layer 29 of armor consisting of thirty 0.087 inch (190 ksi) galvanized wires are stranded over the first layer 28, using a 22 degree lay angle and a left-hand lay to an outside diameter of 1.05 inches. Over this second layer 29 of armor wires, a high density polyethylene jacket 30 is extruded, to an outside diameter of 1.29 inches.

A layer 31 of seven rock armor wires each having a diameter of 0.38 inch (50 ksi) and a tar coat are stranded over the jacket 30, using a lay angle of 57 degrees and a left-hand lay, to a 2.06 inches outside diameter. The function of the rock armor is to provide weight to hold the cable in position; to provide resistance to penetration and crushing; and to provide abrasion resistance to wave motion.

Two servings 32, 33 of nylon yarn, advantageously Hyten type 102, JEA 80, are now applied over the rock armor layer 31. The first layer 32 contains 37 ends, and the second layer 33 contains 38 ends. Both layers use a 5.1 inches lay-length and a right-hand lay. The function of layers 32, 33 is to hold the rock armor in position during the installation of the rock armor lays. The layers also provide corrosion and abrasion protection.

An asphalt layer of tar pitch (not shown) next is applied under, between, and over the yarn ends.

The diameter of the cable 25 measured over the two yarn servings, is, respectively, 2.20 inches and 2.34 inches. Finally, chalk whiting is applied over the entire cable exterior, to prevent the cable from sticking to its adjacent portions when reeled or in a coiling pan or tank, or during manufacture.

A theoretical torsional stiffness to bending stiffness ratio, JG/EI, of 2.71 is calculated for the rock armor cable of this example. The actual JG/EI measured to be in a range from 2.2 to 2.63. The reduction in the critical ratio was achieved by the same design innovations as are explained above for the cable of example 1.

The rock armor wires of the layer 31 act like a spring in this design. During coiling, the rock armor wires unlay and are not restrained. For this cable, the theoretical JG/EI ratio was 2.71, where JG=385,682, and EI=142,539. The JG/EI ratio as measures experimentally ranged from 2.2 to 2.63. The low ratio is achieved in the design as described; and it contributes to the coilability of the cable.

I claim:
1. An electrical cable comprising:
    a transmission core;
    armor means surrounding said core, comprising at least one layer of armor wires;
    said core and said armor means adapted to achieve a substantially torque-balanced cable structure; and
    said cable being characterized by a torsional stiffness to bending stiffness ratio of not more than substantially 3.
2. An electrical cable pursuant to claim 1, wherein said armor means comprises:
    first and second layers of armor wires, each layer having a lay angle of not more than substantially 10 degrees.
3. An undersea telecommunications cable comprising:
    an optical fiber telecommunications core;
    armor means surrounding said core, comprising first and second layers of armor wires, each layer having a lay angle of not more than substantially 10 degrees; and
    an extruded outer jacket surrounding said armor layers;

said core and armor means applied so as to achieve a substantially torque-balanced cable structure; and said cable characterized by a torsional stiffness to bending stiffness ratio of not more than substantially 3.

4. The cable of claim 3, wherein said first and second armor layers cover the underlying surface to a degree of not greater than 92 percent.

5. The cable of claim 4, further comprising:
a first application of tape wrapped around said first layer of armor wires, said tape having a lay opposite to that of said first armor layer; and
a second application of tape wrapped around said second layer of armor wires, said second tape application having a lay opposite to that of said second armor layer;
said tape applications aiding movement of said armor wire during coiling, while holding said armor wires in their installed position during manufacture.

6. The cable of claim 5, wherein said tape comprises glass reinforced polyester material.

7. The cable of claim 6, wherein said tapes are applied with an open lay to create a gap between adjacent turns of said tape, thereby to allow the extruded substance of said outer jacket to extend to the region between the tape and the valleys formed by adjacent armor wires, and bond said outer jacket 24 and said armor layers.

8. The cable of claim 5, wherein said wires of at least one of said armor wire layers are substantially preformed to an inner diameter that marginally exceeds the diameter of the next interior layer of said cable.

9. An optical fiber undersea cable system comprising:
a first optical fiber cable structured pursuant to claims 5, 6, or 7; and
a second optical fiber cable comprising:
a trunk core;
a jacket extruded over said core;
a first armor layer comprising a plurality of galvanized steel wires, disposed at a lay angle of approximately 20 degrees;
a second armor layer stranded over said first armor layer, disposed at a lay angle of approximately 22 degrees and in a lay opposite to said first armor layer;
said first and second armor layers being structured to be substantially torque-balanced; and
a high density polyethylene jacket extruded over said armor layers;
a layer of a plurality of rock armor wires embedded in a tar coat, stranded over said jacket, disposed at a substantial lay angle; and
first and second servings of nylon yarn applied over said rock armor layer.

10. The cable according to claim 9, wherein the torsional stiffness to bending stiffness ratio is maintained at not more than 3.00.

* * * * *

UNITED STATES PATENT AND TRADEMARK OFFICE
CERTIFICATE OF CORRECTION

PATENT NO. : 4,979,795

DATED : December 25, 1990

INVENTOR(S) : Olinda Mascarenhas

It is certified that error appears in the above—identified patent and that said Letters Patent is hereby corrected as shown below:

Colum 2, Line 62 - change "FIG. 4 is side view" to --FIG. 4 is a side view--.

Column 3, Line 48 - change "tension the point" to --tension at the point--.

Column 4, Line 30 - change "precent" to --percent--.

Column 4, Line 67 - change "wires.," to --wires--.

Column 5, Line 13 - change "design," to --design--.

Column 5, Line 21 - change "inch-squared-pounds" to --inch-squared pounds--.

UNITED STATES PATENT AND TRADEMARK OFFICE
CERTIFICATE OF CORRECTION

PATENT NO. : 4,979,795

DATED : December 25, 1990

INVENTOR(S) : Olinda Mascarenhas

It is certified that error appears in the above-identified patent and that said Letters Patent is hereby corrected as shown below:

Column 5, Line 22 - change "inch-squared-pounds" to --inch-squared pounds--.

Column 5, Line 28 - change "per-cent" to --percent--.

Column 5, Line 37 - change "percent, and that of" to --percent.--.

Column 6, Line 26 - change "servings," to --servings--.

Signed and Sealed this

Fourth Day of August, 1992

*Attest:*

DOUGLAS B. COMER

*Attesting Officer*     *Acting Commissioner of Patents and Trademarks*